United States Patent
Nikitin et al.

(10) Patent No.: US 7,257,807 B2
(45) Date of Patent: Aug. 14, 2007

(54) METHOD FOR OPTIMIZING EXECUTION TIME OF PARALLEL PROCESSOR PROGRAMS

(75) Inventors: Andrey A. Nikitin, Moscow (RU); Alexander E. Andreev, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 871 days.

(21) Appl. No.: 10/667,812

(22) Filed: Sep. 22, 2003

(65) Prior Publication Data
US 2005/0066321 A1     Mar. 24, 2005

(51) Int. Cl.
*G06F 9/45* (2006.01)
*G06F 9/30* (2006.01)

(52) U.S. Cl. .................. 717/152; 717/151; 717/153; 717/154; 717/159; 712/206

(58) Field of Classification Search ......... 717/151–161
See application file for complete search history.

(56) References Cited

U.S. PATENT DOCUMENTS

| | | | | |
|---|---|---|---|---|
| 5,481,708 A | * | 1/1996 | Kukol .................... | 717/155 |
| 5,535,391 A | * | 7/1996 | Hejlsberg et al. ......... | 717/140 |
| 5,758,164 A | * | 5/1998 | Inoue .................... | 717/158 |
| 6,064,818 A | * | 5/2000 | Brown et al. ............ | 717/159 |
| 6,202,205 B1 | * | 3/2001 | Saboff et al. ............ | 717/151 |
| 6,651,247 B1 | * | 11/2003 | Srinivasan .............. | 717/161 |
| 2002/0120849 A1 | * | 8/2002 | McKinley et al. ........ | 713/176 |
| 2003/0187798 A1 | * | 10/2003 | McKinley et al. ........ | 705/50 |
| 2004/0083468 A1 | * | 4/2004 | Ogawa et al. ........... | 717/151 |

* cited by examiner

*Primary Examiner*—Meng-Al T. An
*Assistant Examiner*—Jason Mitchel

(57) ABSTRACT

The present invention is directed to a parallel processor language, a method for translating C++ programs into a parallel processor language, and a method for optimizing execution time of a parallel processor program. In an exemplary aspect of the present invention, a parallel processor program for defining a processor integrated circuit includes a plurality of processor commands with addresses. The plurality of processor commands may includes a starting processor command, and each of the plurality of processor commands includes one or more subcommands. When the processor integrated circuit executes the parallel processor program, the processor integrated circuit executes the staring processor command first and then executes the rest of the plurality of processor commands based on an order of the addresses. Moreover, when the processor integrated circuit executes a parallel processor command, the processor integrated circuit executes all subcommands included in the parallel processor command in parallel in one clock cycle.

9 Claims, 5 Drawing Sheets

```
unsigned x[10], y[10], i, j, k, dir;

void exch (unsigned pos1, unsigned pos2) {
   unsigned tmp;
   tmp=y[pos1]; y[pos1]=y[pos2]; y[pos2]=tmp;
}
unsigned need_exch (unsigned pos1, unsigned pos2) {
   if (dir==0) {
      return (y[pos1]<y[pos2]);
   }
   else {
      return (y[pos1]>y[pos2]);
   }
} void main () {
   for (i=0;i<10;i=i+1) y[i]=x[i];
   for (i=9;i>=1;i=i-1) {
      for (j=0; j<i; j=k) {
         k = j+1;
         if (need_exch(j, k))
            exch(j, k);
      }
   }
}
```

*FIG. 1*

0: READ y exch::pos1;           // function "exch"
1: SET exch::tmp y;             // tmp = y[pos1];
2: READ y exch::pos2;
3: WRITE y y pos1;              // y[pos1] = y[pos2];
4: WRITE y exch::tmp pos2;      // y[pos2] = tmp;
5: RETURN;                      // return from function "exch"

6: SET ALD_0 dir; SET_CONST ALD_1 0; SET_CONST ALD_OP "==";
                                // function "need_exch"
7: ZERO_JUMP ALD_Z 13;          // if (dir==0)
8: READ y need_exch::pos1;
9: PUT y;
10: READ y need_exch::pos2;
11: SET ALD_0 STCK_0; SET ALD_1 y; SET_CONST ALD_OP "<"; DROP 1;
12: PUT ALD_Z; RETURN;          // return (y[pos1]<y[pos2])
13: READ y need_exch::pos1;
14: PUT y;
15: READ y need_exch::pos2;
16: SET ALD_0 STCK_0; SET ALD_1 y; SET_CONST ALD_OP ">"; DROP 1;
17: PUT ALD_Z; RETURN;          // return (y[pos1]>y[pos2])

18: SET_CONST i 0;              // main function
19: READ x i;
20: SET y x i;                  // y[i]=x[i]
21: LOOP_INC_NOMORE i 8 19;     // cycle for(i=0;i<10;i=i+1)
22: SET_CONST i 9;              // i=9
23: SET_CONST j 0;              // j=0
24: SET ALD_0 j; SET ALD_1 i; SET_CONST ALD_OP "<";
25: ZERO_JUMP ALD_Z 37;
26: SET ALD_0 j; SET_CONST ALD_1 1; SET_CONST ALD_OP "+";
27: SET k ALD_Z;                // k=j+1
28: SET need_exch::pos1 j;
29: SET need_exch::pos2 k;
30: CALL 6;                     // call function need_exch(j, k)
31: DROP 1; ZERO_JUMP STCK_0 35;
32: SET exch::pos1 j;
33: SET exch::pos2 k;
34: CALL 0;                     // call function exch(j ,k)
35: SET j k;
36: JUMP 24;                    // cycle for(j=0;j<i;j=k)
37: LOOP_DEC_NOLESS i 1 23;     // cycle for(i=9;i>=0;i=i-1)
38: FIN;

*FIG. 2*

0: READ y exch::pos1;                // function "exch"
1: SET exch::tmp y; READ y exch::pos2;
2: WRITE y y pos1;
3: WRITE y exch::tmp pos2; RETURN;

4: SET ALD_0 dir; SET_CONST ALD_1 0; SET_CONST ALD_OP "==";
                                     // function "need_exch"
5: ZERO_JUMP ALD_Z 9; READ y need_exch::pos1; SET_CONST ALD_OP "<";
6: PUT y; READ y need_exch::pos2;
7: SET ALD_0 STCK_0; SET ALD_1 y; DROP 1;
8: PUT ALD_Z; RETURN;                // return (y[pos1]<y[pos2])
9: READ y need_exch::pos1; SET_CONST ALD_OP ">";
10: PUT y; READ y need_exch::pos2;
11: SET ALD_0 STCK_0; SET ALD_1 y; DROP 1;
12: PUT ALD_Z; RETURN;               // return (y[pos1]>y[pos2])

13: SET_CONST i 0;       // main function
14: READ x i;
15: SET y x i; LOOP_INC_NOMORE i 8 14;    // cycle for(i=0;i<10;i=i+1)
16: SET_CONST i 9;       // i=9
17: SET_CONST j 0;       // j=0
18: SET ALD_0 j; SET ALD_1 i; SET_CONST ALD_OP "<";
19: ZERO_JUMP ALD_Z 24; SET ALD_0 j; SET_CONST ALD_1 1; SET_CONST ALD_OP "+";
20: SET k ALD_Z;         // k=j+1
21: SET need_exch::pos1 j; SET need_exch::pos2 k; SET ALD_0 dir; SET_CONST ALD_1 0; SET_CONST ALD_OP "=="; CALL 5;
                         // call the second command of the function need_exch(j, k)
22: DROP 1; ZERO_JUMP STCK_0 23; SET exch::pos1 j; SET exch::pos2 k; CALL 0;                 // call function exch(j ,k)
23: SET j k; JUMP 18;    // cycle for(j=0;j<i;j=k)
24: LOOP_DEC_NOLESS i 1 17; FIN;    // cycle for(i=9;i>=0;i=i-1)

*FIG. 6*

METHOD FOR OPTIMIZING EXECUTION TIME OF PARALLEL PROCESSOR PROGRAMS

CROSS-REFERENCE TO RELATED DOCUMENTS

The present application herein incorporates U.S. patent application Ser. No. 10/621,737, filed Jul. 17, 2003, by reference in its entirety.

FIELD OF THE INVENTION

The present invention generally relates to the field of integrated circuits, particularly to a parallel processor language, and more specifically to a method for translating C++ programs into a parallel processor language and a method for optimizing execution time of a parallel processor program.

BACKGROUND OF THE INVENTION

Integrated circuits (ICs) are developed in order to process information. Every IC has at least one input and at least one output. An IC receives input data, processes the data and then produces the result. In many cases, ICs are defined by means of high-level languages such as the C++ programming language. One type of ICs, called a processor, is capable of executing programs that are written using a special language consisting of small simple commands instead of the C++ programming language. A language that consists of simple commands is defined as a processor language, and a program written in a processor language is defined as a processor program.

For example, the following C++ command:

Z=A+B+C may be presented as a sequence of simple commands that can be processed by a processor IC:

1. Take A.
2. Take B.
3. Evaluate A+B.
4. Take C.
5. Evaluate (A+B)+C.
6. Move the result to Z.

It is easy to see that the result of such a presence of any C++ command is the sequence of several simple commands. In the above example, one C++ command is translated into 6 simple commands. Consequently, if a processor executes one simple command per one clock cycle, it may take 6 clock cycles to execute the considered C++ command. Thus, one of the most important problems is to minimize the time for a processor to execute a C++ program and to minimize the size of a processor program.

Thus, it would be desirable to provide a processor language that allows some simple commands be carried out in parallel. This parallel processor language may consist of very small number of different commands so that the processor IC that executes these commands is easy to create, and the processor IC may have a small area and may be able to execute commands with high speed or high frequency. Moreover, it would also be desirable to provide a method for translating a C++ program into a parallel processor program, which method may minimize the size of the obtained processor program.

A processor program loaded to a processor may be written in two different ways: (1) the program may be first written in some high-level programming language like C++, Pascal, etc., and the program may be then translated into the processor language; and (2) the program may be written in a processor language manually. In either case, it would be desirable to provide a method (e.g., an algorithm, and the like) that allows the execution time of a processor program to be optimized (e.g., minimized). That is, it would be desirable to provide a method for optimizing execution time of a processor program written in a parallel processor language, which method may receive a processor program, optimize this program and output a resulted program that is functionally equivalent to the original one but has reduced execution time.

SUMMARY OF THE INVENTION

Accordingly, the present invention is directed to a parallel processor language, a method for translating C++ programs into a parallel processor language, and a method for optimizing execution time of a parallel processor program. In a first exemplary aspect of the present invention, a parallel processor program for defining a processor integrated circuit includes a plurality of processor commands with addresses. The plurality of processor commands may include a starting processor command, and each of the plurality of processor commands includes one or more subcommands. When the processor integrated circuit executes the parallel processor program, the processor integrated circuit executes the staring processor command first and then executes the rest of the plurality of processor commands based on an order of the addresses. Moreover, when the processor integrated circuit executes a parallel processor command, the processor integrated circuit executes all subcommands included in the parallel processor command in parallel in one clock cycle.

In a further exemplary aspect of the present invention, a method for translating a C++ program into a parallel processor program with a minimum size defining a processor integrated circuit may include the following steps: (a) dividing the C++ program into a plurality of C++ functions allowed to call each other; (b) translating the plurality of C++ functions into a plurality of blocks TRANS(<C++ function>) written in a parallel processor language; and (3) concatenating the plurality of blocks TRANS(<C++ function>) into the parallel processor program.

In another exemplary aspect of the present invention, a method for optimizing execution time of a parallel processor program may include the following steps: (a) receiving a parallel processor program; (b) making dummy jumps optimization; (c) making linear code optimization; (d) making jumps optimization; (e) returning back to said step (b) when there is any change made in said steps (b), (c), and (d); and (f) outputting a resulted new processor program when there is no change made in said steps (b), (c), and (d).

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 shows an exemplary C++ program "ORDER";

FIG. 2 shows a result after the C++ program "ORDER" shown in FIG. 1 is translated into a parallel processor program in accordance with an exemplary embodiment of the present invention;

FIG. 6 shows a result after the program shown in FIG. 2 is optimized in accordance with an exemplary embodiment of the present invention.

DETAILED DESCRIPTION OF THE INVENTION

Figure 3:
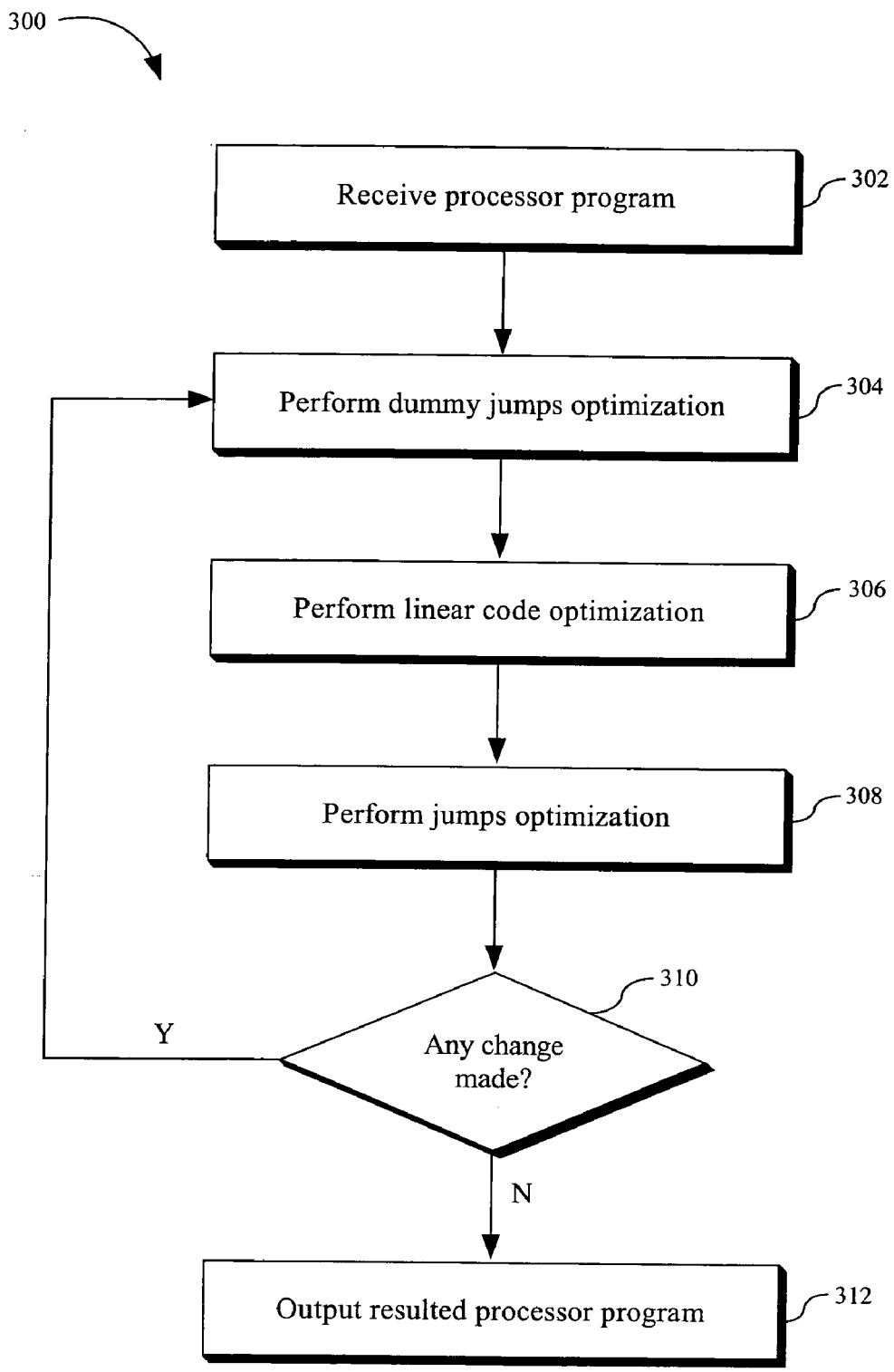
FIG. 3 is a flow diagram showing an exemplary method for optimizing execution time of a parallel processor program in accordance with an exemplary embodiment of the present invention.

Reference will now be made in detail to the presently preferred embodiments of the invention, examples of which are illustrated in the accompanying drawings.

A. Considered C++ Language

As an example, C++ programs that include the following C++ constructions only are considered. However, it is contemplated that other C++ constructions may also be used without departing from the scope and intent of the present invention.

(1) Unsigned Integer Variables

An example is: unsigned i;

(2) Unsigned One-dimensional Arrays

An example is: unsignedx[10];

(3) One or More C++ Functions

One of these functions must be the function void main (), which is the main function of the C++ program. All the functions may be of one of two types: unsigned and void. Each of the types is allowed to have some unsigned integer arguments and some unsigned integer local variables.

The following is an example:
unsigned need_exchange (unsigned pos1, unsigned pos2)
{
unsigned val;
....................................
}

In this example, the pos1 and pos2 are arguments of the function need_exchange, and the variable val is the local variable of this function.

(4) The body of each function may include the following C++ operators only a. return-operator There may be two situations:

return <expression>; inside any function of the type unsigned;

return; inside any function of the type void.

The term <expression> represents any C++ expression that includes C++ variables, unsigned integer constants, arithmetic-logical operations (+, −, *, /, %, <, <=, >, >=, ==, !=, !, ~, &, |, ^, &&, ||, <<, >>, etc.) and calls of unsigned integer functions. An example may be: return need_exchange (i, i+1);

b. set-operator

The representation may be:

<variable>=<expression>, where the term <variable> is a name of an unsigned integer variable, or a name of an unsigned integer array with index expression:

<unsigned_integer_array>[<index_expression>].

The following are some examples:

i=i+1;

x[1]=i;

x[2]=0;

x[i+1]=x[i]+need_exchange(i, i+1);

c. void function call-operator

The representation may be:

<void_function_name>(<list_of_arguments>);

d. if-operator

The representation may be:

if (<expression>)<positive_operator> else <negative operator> where the <positive_operator> and <negative_operator> are any allowed C++ operators. Note that the branch else <negative operator> is optional.

The following are some examples:

if (x[0]==5) x[0]=0;

or if (x[0]==5) x[0]=0;

else x[0]=x[0]+1;

e. while-operator

The representation may be:

while (<expression>)<body> where <body> is any allowed C++ operator. An example is:

while (x[i]==0) i=i+1;

f. for-operator

The representation may be:

for    (<at_start>;<expression>;<at_iteration_finish>)
    <body> where <at_start> and <at_iteration_finish> are the set-operators or empty, and <body> is any allowed C++ operator. Since the while-operator may be considered as a for-operator with empty operators <at_start> and <at_iteration_finish>, the while-operator will not be considered any further in the present application.

g. begin-end-operator

The representation may be:

{
<operator_1>
.....................
<operator_N>
} where <operator_1>, . . . , <operator_N> are any allowed C++ operator.

h. break-operator

The representation may be:

break,

This operator may be placed inside the while and for operators.

Now all possible C++ constructions allowed to be used in a C++ program considered in the present application have been provided. The information on the syntax and the meanings of these constructions may be found in any book that is devoted to the C++ programming language.

FIG. 1 shows an exemplary C++ program called "ORDER". Those of ordinary skill in the art will understand that the exemplary C++ program "ORDER" shown in FIG. 1 orders the unsigned integer array x in the ascending order if dir!=0 and orders the array x in the descending order if dir==0. The ordered array is stored in the unsigned integer array y.

B. Processor Language

A processor program is a list of processor commands. Each processor command may include no more than N small commands called subcommands. In each clock cycle a processor IC executes one processor command. Thus, the processor IC may execute N subcommands in parallel in a clock cycle. As a result, a processor language and a processor program in accordance with the present invention are also called a parallel processor language and a parallel processor program, respectively.

When N is large, a complicated processor IC has to be developed to carry out N subcommands simultaneously. On the other hand, the time of the processor program execution may become much shorter than is the case of small N. When N is small, a simple processor may be required but the processor program is executed with low speed. In practice, N=6 may be taken.

A processor may carry out a processor program as follows. All commands of the processor program are enumerated by numbers 0, 1, 2, . . . . These numbers are called addresses of commands. The processor program may have a starting address that is the address of the command that should be executed first (starting processor command) when the processor begins the program execution. In each clock cycle, the processor carries out one processor command and carries out all its subcommands one-by-one. All the subcommands may be divided into 2 groups: jump-subcommands and non-jump-subcommands (all other subcommands). Jump-subcommands show the processor the next command to be executed. When the processor meets a jump-subcommand, the processor may stop execution of the current command and go (or jump) to the other command in the next clock cycle. When the processor does not meet any jump-command during execution of a command with address ADDRESS, then in the next clock cycle the processor executes the command with address ADDRESS+1.

The processor program is allowed to use some predefined unsigned integer variables and some one-dimensional unsigned integer arrays of the constant length.

All possible types of subcommands in a parallel processor program in accordance with the present invention may be described as follows.

(1) Subcommand for Finishing the Processor Program Execution—FIN

When a processor meets the command FIN, the processor stops the execution of the program.

(2) Subcommands for Reading and Writing Unsigned Integer Variables and Arrays

Different variables and arrays may be accessed (read and written) independently from each other. Any variable may be read any time. To write a new value to a unsigned integer variable, one of the following two commands may be used:

SET <variable_name_1><variable_name_2>
SET_CONST
 <variable_name_1><unsigned_integer_constant>

The subcommands SET and SET_CONST assign the value of the variable <variable_name_2> and the constant <unsigned_integer_constant> (respectively) to the variable <variable_name_1>. Both of these two subcommands take 1 clock cycle to perform the assignment, so the value of the variable <variable_name_1> cannot be written one more time inside the same processor command.

The unsigned integer arrays need 1 clock cycle for either reading or writing. That means that one cannot both read and write, or read 2 times, or write 2 times inside the same processor command. The following are the subcommands for reading arrays:

READ <array_name><variable_name>
READ_CONST
 <array_name><unsigned_integer_constant>

The subcommands READ and READ_CONST read the value of the elements of array <array_name> with indexes equal to the value of variable <variable_name> and equal to the constant <unsigned_integer_constant>, respectively. Since array reading takes 1 clock cycle, the value read may be used in the next processor command and later only. This value may be used starting from the next processor command (or next clock cycle) while other reading or writing operation with the array <array_name> is not performed.

For example, consider a small C++ program:

y=x[i]; z=0;

The following processor program may perform the same action as the above C++ program:

0: READ x i;
1: SET_CONST z 0;
2: SET y x;
3: FIN;

where the array x is read in the command with the address 0, so the value x may be used only in commands 1, 2, . . .

The following is a list of subcommands for writing arrays:

WRITE_VAR_VAR
 <array_name><variable_name><index_variable_name>
WRITE_VAR_CONST
 <array_name><variable_name><index_constant>
WRITE_CONST_VAR
 <array_name><constant><index_variable_name<
WRITE_CONST_CONST
 <array_name><constant><index_constant>

The subcommands WRITE_VAR_VAR and WRITE_VAR_CONST write the value of the variable <variable_name> to the element of the array <array_name> with index equal to the value of the variable <index_variable_name> and equal to the unsigned integer constant <index_constant>, respectively. The subcommands WRITE_CONST_VAR and WRITE_CONST_CONST write the constant <constant> to the element of the array <array_name> with index equal to the value of the variable <index_variable_name> and equal to the unsigned integer constant <index_constant>, respectively. These 4 subcommands take 1 clock cycle to perform a writing operation.

(3) Arithmetic-logical Operations Evaluation

There is a special arithmetic-logical device (called ALD) that serves to evaluate arithmetic and logical operations that are included in the C++ expressions. All the arithmetic-logical operations (+, −, *, /, %, <, <=, >, >=, ==, !=, !, ~, &, |, ^, &&, ||, <<, >>, etc.) are enumerated. Each of these operations has its own unsigned integer identifier. The maximal number of arguments of these operation is 2.

There are 4 special variables: ALD_0, ALD_1, ALD_OP, ALD_Z with the following meanings. The variables ALD_0 and ALD_1 store values of operation arguments, and the variable ALD_OP stores the identifier of the operation. The variables ALD_0, ALD_1 and ALD_OP are write-only variables. The variable ALD_Z is a read-only variable that stores the result of the operation ALD_OP applied to the values of variables ALD_0 and ALD_1. In order to evaluate the operation one may write the corresponding values to the variables ALD_0, ALD_1 and ALD_OP (using subcommands SET and SET_CONST described above) and read the variable ALD_Z. Note that because writing values of the variables ALD_0, ALD_1 and ALD_OP takes 1 clock cycle, the value of the variable ALD_Z is allowed to be read one clock cycle later after the values of the variables ALD_0, ALD_1 and ALD_OP are written.

For example, consider a C++ program:

y=i+1

This program may be translated into a processor program as follows:

0: SET ALD_0 i; SET ALD_1 1; SET ALD_OP identifier(+);
1: SET y ALD_Z;
2: FIN;

where the command with address 0 consists of 3 subcommands that write values of variables ALD_0, ALD_1 and ALD_OP in parallel.

(4) Storing Temporary Results of Evaluations

During the evaluation of complicated C++ expressions, it may be necessary to keep temporary results. There is a stack EVAL_STACK that is used for this purpose. This stack is based on the principle LIFO (last in first out). There are several subcommands for putting, reading and removing values from the stack EVAL_STACK.

PUT <variable_name>
PUT_CONST <unsigned_integer_constant>
DROP <unsigned_integer_constant>

The subcommands PUT and PUT_CONST put the value of the variable <variable_name> and the constant <unsigned_integer_constant> (respectively) to the stack EVAL_STACK. The subcommand DROP removes the <unsigned_integer_constant> values from the stack EVAL_STACK. These 3 commands each take 1 clock cycle to perform the actions with the stack. That is why one is not allowed to use 2 or more subcommands PUT, PUT_CONST and DROP inside the same processor command. The values that are stored in the stack EVAL_STACK may be read using variables STCK_0, STCK_1, etc. The variable STCK_0 stores the value that was put in the stack last. The variable STCK_1 stores the value that was put in the stack second to the last, etc. In the following example how to use subcommands to control the stack EVAL_STACK is shown.

Consider a C++ program:

i=j; y=0;

This program may be translated to:

0: PUT j;
1: PUT_CONST 0;
2: SET i STCK_1; SET y STCK_0; DROP 2;
3: FIN;

Note that the subcommands PUT, PUT_CONST and DROP are not placed inside the same processor command.

(5) Calling Functions

There are 2 subcommands for calling a function and returning back from the function:

CALL <address>
RETURN

These two subcommands are jump-subcommands. The subcommand CALL causes the processor to go to the command with the address <address>. The subcommand RETURN returns the processor to the command that follows the command containing the last performed subcommand CALL.

(6) All Other Jump-Subcommands

The following is a list of all other jump-subcommands:

JUMP <address>
ZERO_JUMP <variable_name><address>
NONZERO_JUMP <variable_name><address>
LOOP_INC_NOLESS
    <variable_name><constant_value><address>
LOOP_INC_NOMORE
    <variable_name><constant_value><address>
LOOP_DEC_NOLESS
    <variable_name><constant_value><address>
LOOP_DEC_NOMORE
    <variable_name><constant_value><address>

The subcommand JUMP indicates that the processor jumps to the command with address <address>. Note that the term "jump to the command with the address <address>" means that the processor executes the command with address <address> in the next clock cycle instead of the command that follows the current command.

The subcommands ZERO_JUMP and NONZERO_JUMP read the value of the variable <variable_name>. If the value read is equal to 0 (ZERO_JUMP) or this value is not equal to 0 (NONZERO_JUMP), then the processor stops execution of the current command and jumps to the command with address <address>. Otherwise, the processor continues execution of the current command.

More complicated actions are performed when the processor meets the commands LOOP_INC_NOLESS, LOOP_INC_NOMORE, LOOP_DEC_NOLESS, LOOP_DEC_NOMORE. In this case the processor may perform the following actions:

a) The processor checks if the value of the variable <variable_name> is not less than the constant <constant_value> for subcommands LOOP_INC_NOLESS and LOOP_DEC_NOLESS, and the processor checks if the value of the variable <variable_name> is not more than the constant <constant_value> for subcommands LOOP_INC_NOMORE and LOOP_DEC_NOMORE;

b) The processor increases the value of the variable <variable_name> by 1 for subcommands LOOP_INC_NOLESS and LOOP_INC_NOMORE, and decreases the value of the variable <variable_name> by 1 for subcommands LOOP_DEC_NOLESS and LOOP_DEC_NOMORE;

c) If the result of checking in a) above is true, then the processor stops execution of the current command and jumps to the command with address <address>. Otherwise, the processor continues execution of the current command.

Note that each of 4 subcommands LOOP* above deals with writing a new value to the variable <variable_name>. Thus, like a subcommand SET, each takes 1 clock cycle.

C. Translation of C++ Programs into Processor Language

According to an exemplary embodiment of the present invention, the method for translating a C++ programs into the processor language (described in Part B above) may minimize the size of obtained processor program. The size of a processor program is the total number of subcommands that are included in all commands of the processor program.

(1) Definitions a. F::VAR

If a variable VAR is a local variable of the C++ function F or the variable VAR is an argument of the C++ function F, one may denote this variable F::VAR.

b. Block

Block is a sequence of processor commands. The present method constructs a processor program from some blocks.

c. TRANS(<C++ program>) and TRANS(<C++ function>)

A C++ program can be considered as a list of C++ functions that are allowed to call each other. Each of these functions may be translated into a processor language separately.

Denote TRANS(<C++ program>) as a processor program that is the result of translation of the C++ program <C++ program> into the processor language. Denote TRANS (<C++ function>) as a block obtained as the result of translation of C++ function into the processor language. The processor program TRANS(<C++ program>) may be presented as the concatenation of blocks TRANS(<C++ function>) created for each function included in the C++ program.

The C++ program ORDER shown in FIG. 1 may be shown as:
- 0: TRANS(exch)
- 1: TRANS(need_exch)
- 2: TRANS(main)

The starting address of the obtained processor program is the starting address of the block TRANS(main) created for the main function of the C++ program.

(2) Translation of C++ Function

Now how to create the block TRANS(<C++ function>) is described. Any C++ function has a body starting with the symbol "{" and finishing by the symbol "}". This body may be considered as a begin-end-command. This command may be denoted as <C++ function body>.

For example, the body of the function "exch" of the program "ORDER" shown in FIG. 1 is the following begin-end-operator:
{
    tmp=y[pos1]; y[pos1]=y[pos2];y[pos2]=tmp;
}

According to an exemplary embodiment of the present invention, the block TRANS(<C++ function>) is presented as:
- 0: TRANS(<C++ function body>)
- 1: <function_finish_command> where the TRANS(<C++ function body>) is the block obtained as a result of translating the C++ command <C++ function body> into the processor language, and the <function_finish_command> is the following processor command:
  a) if the <C++ function> is the main function, then the command <function_finish_command> is the command:
    FIN
  b) if the <C++ function> is any void function except the main function, then the command <function_finish_command> is the command:
    RETURN
  c) if the <C++ function> is any unsigned integer function, then the command <function_finish_command> is empty.

Now it is needed to explain how to create the block TRANS(<C++ command>) for any allowed C++ command. But before that, translation of expressions is described.

(3) Translation of C++ Expressions

In the present invention, one may consider any C++ expressions that contain C++ variables, unsigned integer constants, arithmetic-logical operations (+, −, *, /, %, <, <=, >, >=, ==, !=, !, ~, &, |, ^, &&, ||, <<, >>, etc.), and calls of unsigned integer functions.

A recursive definition of a C++ expression is now given. The expression may be one of:
- A) <unsigned_integer_constant>;
- B) <unsigned_integer_variable_name>;
- C) <unsigned_integer_array_name>[<index>];
- D) <unary_operation><argument1>;
- E) <argument1><binary operation><argument2>;
- F) <C++ function>(<expression1>, <expression2> ... <expressionM>), where <index>, <argument1>, <argument2>, <expression1>, <expression2> ... <expressionM> are some other expressions, <unary_operation> is one of the operations: ~, !, and <binary_operation> is one of the operations: +, −, *, /, %, <, <=, >, >=, ==, !=, &, |, ^, &&, ||, <<, >>, etc.

Translation of the expression into the processor language in each of the cases A, B, C, D, E, F indicated above is now described. One may recursively define the block TRANS (<expression>) as a result of translation of the <expression>, and the variable EXPR_VAR(<expression>) for storing the result of the evaluation of the expression after performing the block of commands TRANS(<expression>).

a. Case A

The <expression> is the constant. The TRANS(<expression>) may be defined as empty, and the EXPR_VAR (<expression>) may be undefined.

b. Case B

The <expression> is the variable. The TRANS(<expression>) may be defined as empty, and the EXPR_VAR (<expression>) may be defined as the variable <unsigned_integer_variable_name>.

C. Case C

The <expression> is the array element. The following may be defined: EXPR_VAR(<expression>)=<unsigned integer_array name>.

The TRANS(<expression>) may be obtained as the following sequence:
- 0: TRANS(<index>)
- 1: <read_array_command> where the block TRANS(<index>) evaluates the expression <index>, and the command <read_array_command> may be created as follows:
  a) if the expression <index> is a constant, then the command <read_array_command> includes 1 subcommand:
    READ_CONST
      <unsigned_integer_array_name><index>
  b) if the expression <index> is not a constant and EXPR_VAR(<index>)==STCK_0, then the command <read_array_command> includes 2 subcommands:
    READ <unsigned_integer_array_name>STCK_0;
    DROP 1;
  c) if the expression <index> is not a constant and EXPR_VAR(<index>)!=STCK_0, then the command <read_array_command> includes 1 subcommand:
    READ <unsigned_integer_array_name> EXPR_VAR (<index>);

d. Case D

The <expression> is the unary operation with one argument. The following may be defined: EXPR_VAR(<expression>)=ALD_Z. The TRANS(<expression>) may be obtained as the following sequence:
- 0: TRANS(<argument1>)
- 1: <call TRANS(need_ALD_command> where the block TRANS(<argument1>) evaluates the expression <argument1>, and the command <call_ALD_command> may be created as follows:
  a) if the expression <argument1> is a constant, then the command <call_ALD_command> includes 2 subcommands:
    SET_CONST ALD_0<argument1>;
    SET_CONST ALD_OP<unary_operation>;
  b) if the expression <argument1> is not a constant and EXPR_VAR(<argument1>)==STCK_0, then the command <call_ALD_command> includes 3 subcommands:
    SET ALD_0 STCK_0;
    DROP 1;
    SET_CONST ALD_OP<unary_operation>;
  c) if the expression <argument1> is not a constant and EXPR_VAR(<argument1>)!=STCK_0, then the command <call_ALD_command> includes 2 subcommands:
    SET ALD_0 EXPR_VAR(<argument1>);
    SET_CONST ALD_OP<unary_operation>;
  e. Case E The <expression> is the binary operation with two arguments. The following may be defined: EXPR_VAR(<expression>)=ALD_Z. The TRANS(<expression>) may be obtained as the following sequence:
  0: TRANS(<argument1>)
  1: <save_argument1_command>
  2: TRANS(<argument2>)
  3: <call_ALD_command> where the blocks TRANS(<argument1>) and TRANS(<argument2>) evaluate the expressions <argument1> and <argument2>, and the commands <save_argument1_command> and <call_ALD_command> may be created as follows.

The command <save argument1_command> may be described as follows:
  a) if the expression <argument1> is a constant, or if EXPR_VAR(<argument1>)==STCK_0, or if the block TRANS(<argument2>) is empty, then the command <save_argument1_command> is empty;
  b) otherwise, the command <save_argument1_command> includes 1 subcommand:
    PUT EXPR_VAR(<argument1>);

The command <call_ALD_command> includes 4 subcommands: <call_ALD_subcommand1>, <call_ALD_subcommand2>, <call_ALD_subcommand3> and <call_ALD_subcommand4>.

The subcommand <call_ALD_subcommand1> sets the value of the first argument of the operation to the variable ALD_0:
  a) if the expression <argument1> is a constant, then it is:
    SET_CONST ALD_0<argument1>;
  b) if expression <argument1> is not a constant, EXPR_VAR(<argument1>)==STCK_0, and EXPR_VAR(<argument2>)==STCK_0, then it is:
    SET ALD_0 STCK_1;
  c) if expression <argument1> is not a constant, EXPR_VAR(<argument1>)==STCK_0, and EXPR_VAR(<argument2>)!=STCK_0, then it is:
    SET ALD_0 STCK_0;
  d) if expression <argument1> is not a constant, EXPR_VAR(<argument1>)!=STCK_0, and the block TRANS(<argument2>) is empty, then it is:
    SET ALD_0 EXPR_VAR(<argument1>);
  e) if expression <argument1> is not a constant, EXPR_VAR(<argument1>)!=STCK_0, the block TRANS(<argument2>) is not empty and constant, and EXPR_VAR(<argument2>)==STCK_0, then it is:
    SET ALD_0 STCK_1;
  f) if expression <argument1> is not a constant, EXPR_VAR(<argument1>)!=STCK_0, the block TRANS(<argument2>) is not empty and constant, and EXPR_VAR(<argument2>)!=STCK_0, then it is:
    SET ALD_0 STCK_0;

The subcommand <call_ALD_subcommand2> sets the value of the second argument of the operation to the variable ALD_1:
  a) if expression <argument2> is a constant, then it is:
    SET_CONST ALD_1<argument2>;
  b) if expression <argument2> is not a constant, then it is:
    SET ALD_1 EXPR_VAR(<argument2>);

The subcommand <call_ALD_subcommand3> sets the identifier of the binary operation to the variable ALD_OP:
  SET_CONST ALD_OP<binary_operation>;

The subcommand <call_ALD_subcommand4> removes the values of the operation arguments from the stack EVAL_STACK (if these values were stored in this stack):
  a) if the subcommand <call_ALD_subcommand1> is "SET ALD_0 STCK_0", then it is:
    DROP 1;
  b) if the subcommand <call_ALD_subcommand1> is "SET ALD_0 STCK_1", then it is:
    DROP 2;
  c) if the subcommand <call_ALD_subcommand1> is not a "SET ALD_0 STCK_0" and not a "SET ALD_0 STCK_1", and the subcommand <call_ALD_subcommand2> is "SET ALD_1 STCK_0", then it is:
    DROP 1;
  d) otherwise it is empty.
  f. Case F The <expression> is the call of the C++ function F. Let M be the number of arguments of the function F, and denote the arguments of this function: a_1, a_2, ... a_M. The called function puts the returned value into the stack EVAL_STACK. Thus, the following may be defined: EXPR_VAR(<expression>)=STCK_0.

The TRANS(<expression>) may be obtained as the following sequence:
  0: TRANS(<expression1>)
  1: <load_argument1_command>
  2: TRANS(<expression2>)
  3: <load_argument2_command>
  ...........................
  2M-1: TRANS(<expressionM>)
  2M: <load_argumentM_command>
  2M+1: <call_command> where the blocks TRANS(<expression1>), TRANS(<expression2>), ... TRANS(<expressionM>) are created to evaluate the expressions <expression1>, <expression2>, ... <expressionM>. The processor commands <load_argument1_command>, ... <load argumentM_command>, and <call_command> are described below.

The command <load_argumentK_command>, where K=1, 2, ... M, may be ed as follows:
  a) if expression <expressionK> is a constant, then the command <load_argumentK_command> includes 1 subcommand:
    SET_CONST F::a_K <expressionK>;
  b) if expression <expressionK> is not a constant and EXPR_VAR(<expressionK>)==STCK_0, then the command <load_argumentK_command> includes 2 subcommands:
    SET F::a_K STCK_0; DROP 1;

c) if expression <expressionK> is not a constant and EXPR_VAR(<expressionK>)!=STCK_0, then the command <load_argumentK_command> includes 1 subcommand:
   SET F::a_K EXPR_VAR(<expressionK>);
The command <call_command> includes 1 subcommand:
   CALL <addr_F>;

where the <addr_F> is the address of the first command in the block TRANS(F), the block obtained as a result of the translation of the C++ function F.

The following examples may be used to illustrate the method of translation of the expressions described above.

g. EXAMPLE 1

Consider the C++ expression that is included in the program ORDER: need_exch(j, k) shown in FIG. 1. This expression is a call of function need_exch, so one may apply the Case F described above.

According to the Case F the block TRANS("need_exch(j, k)") may be presented as:
   0: TRANS("j")
   1: <load_argument1_command>
   2: TRANS("k")
   3: <load_argument2_command>
   4: <call_command>

Both expressions "j" and "k" are variables. Thus, one may apply the Case B for each of these expressions, which means that blocks TRANS("j") and TRANS("k") are empty, EXPR_VAR("j")="j" and EXPR_VAR("k")="k". Then one may apply the case c) for definition of the commands <load_argument1_command> and <load_argument2_command>. Therefore, <load_argument1_command>=SET need_exch::pos1 j, and <load_argument2_command>=SET need_exch::pos2 k. Consequently, one may obtain the final block TRANS("need_exch(j, k)"):
   0: SET need_exh::pos1 j
   1: SET need_exh::pos2 k
   2: CALL <address of first command of block TRANS (need_exch)> h. EXAMPLE 2

Now a more complicated example of the C++ expression is considered:
   EXPR=need_exch(j, k)+need_exch(i, 3).

This expression is the sum (binary operation) of two arguments: need_exch(j, k) and need_exch(i, 3). Thus, one may apply the Case E. Consequently, one may present the block TRANS(EXPR) as:
   0: TRANS("need_exch(j, k)")
   1: <save_argument1_command>
   2: TRANS("need_exch(i, 3)")
   3: <call_ALD_command>

The block TRANS("need_exch(j, k)") has been considered in the Example 1 above. The block TRANS("need_exch(i, 3)") may be created like a block TRANS("need_exch(j, k)") as follows:
   0: SET need_exch::pos1 i
   1: SET_CONST need_exch::pos2 3
   2: CALL <address of first command of block TRANS (need_exch)>

Both EXPR_VAR("need_exch(j, k)") and EXPR_VAR("need_exch(i, 3)") are equal to STCK_0. Thus, one may apply the case a) for definition of the command <save_argument1_command>. Thus, <save_argument1_command> is empty. The command <call_ALD_command> includes 4 subcommands. For the subcommand <call_ALD_subcommand1> the case b) is applied for definition, for the subcommand <call_ALD_subcommand2> the case b) is applied for definition, and for the subcommand <call_ALD_subcommand4> the case b) is also applied for definition. Taking all into account, the final block TRANS(EXPR) may be written as follows:
   0: SET need_exch::pos1 j
   1: SET need_exch::pos2 k
   2: CALL <address of first command of block TRANS (need_exch)>
   3: SET need_exch::pos1 i
   4: SET_CONST need_exch::pos2 3
   5: CALL <address of first command of block TRANS (need_exch)>
   6: SET ALD_0 STCK_1; SET ALD_1 STCK_0; SET_CONST ALD_OP "+"; DROP 2;

(4) Translation of C++ Commands
a. Return-operator
The return-operator can be of one of two following types: 1A and 1B.

1A. Return-operator Inside the Void Functions: Return;
The result TRANS(<return-operator>) of the translation of this operator is one processor command:
RETURN;

1B. Return-operator Inside the Functions that Returns Unsigned Integer Value: return <expression>;
The values returned by unsigned integer C++ functions are placed in the stack EVAL_STACK. The block TRANS (<return-operator>) may be created as the following:
   0: TRANS(<expression>)
   1: <put_value_command> where the command <put_value_command> includes 2 subcommands: <put_value_subcommand1> and the subcommand RETURN.

The subcommand <put_value_subcommand1> may be created according to the following rules:
   a) if the expression <expression> is a constant, then the subcommand <put_value_subcommand1> is:
      PUT_CONST <expression>;
   b) if the expression <expression> is not a constant and EXPR_VAR(<expression>)==STCK_0, then the subcommand <put_value_subcommand1> is empty;
   c) if the expression <expression> is not a constant and EXPR_VAR(<expression>)!=STCK_0, then the subcommand <put_value_subcommand1> is:
      PUT EXPR_VAR(<expression>);

Now the return-operator return (y[pos1]<y[pos2]), from the program ORDER shown in FIG. 1 is considered. One may apply the type 1B. One may obtain that EXPR_VAR ("y[pos1]<y[pos2]")==ALD_Z, and the block TRANS("y [pos1]<y[pos2]") is:
   0: READ y pos1;
   1: PUT y;
   2: READ y pos2;
   3: SET ALD_0 STCK_0; SET ALD_1 y; SET_CONST ALD_OP "<"; DROP 1;

Thus in order to construct the block TRANS("return (y[pos1]<y[pos2]);"), the following command may be appended:
   4: PUT ALD_Z; RETURN;

to the end of the block TRANS("y[pos1<y[pos2]").

b. Set-operator
The set-operator can be of one of two following types: 2A and 2B.

2A. <variable_name>=<expression>
The block TRANS(<set-operator>) is:
0: TRANS(<expression>)
1: <set_command> where the command <set_command> may be created according to the following rules:
   a) if the expression <expression> is a constant, then the command <set_command> is:
      SET_CONST<variable_name><expression>;
   b) if the expression <expression> is not a constant and EXPR_VAR(<expression>)==STCK_0, then the command <set_command> is:
      SET <variable_name> STCK_0; DROP 1;
   c) if the expression <expression> is not a constant and EXPR_VAR(<expression>)!=STCK_0, then the subcommand <set_command> is:
      SET <variable_name> EXPR_VAR(<expression>);

Now the set-operator k=j+1 from the program ORDER shown in FIG. 1 is considered. Applying the method of the translation of the expressions, one may obtain that EXPR_VAR("j+1")==ALD_Z, and the block TRANS("j+1") is Thus, the required block TRANS("k=j+") may be obtained according to rule c) above as follows:
   0: SET ALD_0 j; SET_CONST ALD_1 1; SET_CONST ALD_OP "+";

Thus, the required block TRANS("k=j+1") may be obtained according to rule c) above as follows:
   0: SET ALD_0 j; SET_CONST ALD_1 1; SET_CONST ALD_OP "+";
   1: SET k ALD_Z;

2B. <unsigned_integer_array>[<index_expression>]=<expression>
The block TRANS(<set-operator>) is:
0: TRANS(<expression>)
1: <save_expression_command>
2: TRANS(<index_expression>)
3: <set_command>

The command <save_expression_command> may be obtained according to the following rules:
   a) if the block TRANS(<expression>) is empty, the block TRANS(<index_expression>) is empty, or EXPR_VAR(<expression>)==STCK_0, then the command <save_expression_command> is empty.
   b) otherwise, the command <save_expression_command> is:
      PUT EXPR_VAR(<expression>);

The command <set_command> includes 2 subcommands: <set_subcommand1> and <set_subcommand2> obtained according to the following rules:
   a) if the expression <expression> is a constant, the following cases aa), ab), and ac) are considered:
      aa) if the expression <index_expression> is a constant then the following may be assigned:

<set_subcommand1>: WRITE_CONST_CONST <unsigned_integer_array> <expression> <index_expression>;
<set_subcommand2>: empty.

ab) if the expression <index_expression> is not a constant and EXPR_VAR(<index_expression>)==STCK_0, then one may assign:

<set_subcommand1>: WRITE_CONST_VAR <unsigned_integer_array> <expression>STCK_0;
<set_subcommand2>: DROP 1.

ac) if the expression <index_expression> is not a constant and EXPR_VAR(<index_expression>)!=STCK_0, then one may assign:

<set_subcommand1>: WRITE_CONST_VAR <unsigned_integer_array> <expression> EXPR_VAR(<index_expression>);
<set_subcommand2>: empty;

b) if the expression <expression> is not a constant and at least one of the following two conditions is valid:
      EXPR_VAR(<expression>)==STCK_0
      the command <save expression_command> is not empty;
   then one may consider cases ba), bb), and bc) as follows:
      ba) if the expression <index_expression> is a constant then one may assign:

<set_subcommand1>: WRITE_VAR_CONST <unsigned_integer_array> STCK_0 <index_expression>;
<set_subcommand2>: DROP 1.

bb) if the expression <index_expression> is not a constant and EXPR_VAR(<index_expression>)==STCK_0, then one may assign:

<set_subcommand1>: WRITE_VAR_VAR <unsigned_integer_array> STCK_1 STCK_0;
<set_subcommand2>: DROP 2.

bc) if the expression <index_expression> is not a constant and EXPR_VAR(<index_expression>)!=STCK_0, then one may assign:

<set_subcommand1>: WRITE_VAR_VAR <unsigned_integer_array> STCK_0 EXPR_VAR(<index_expression>);
<set_subcommand2>: DROP 1;

c) if the expression <expression> is not a constant, EXPR_VAR(<expression>)!=STCK_0, and the command <save_expression_command> is empty, then the following cases ca), cb), and cc) may be considered:
      ca) if the expression <index_expression> is a constant, then one may assign:

<set_subcommand1>: WRITE_VAR_CONST <unsigned_integer_array> EXPR_VAR(<expression>) <index_expression>;
<set_subcommand2> empty.

cb) if the expression <index_expression> is not a constant and EXPR_VAR(<index_expression>)== STCK_0, then one may assign:

| | |
|---|---|
| <set_subcommand1>: | WRITE_VAR_VAR |
| <unsigned_integer_array> EXPR_VAR(<expression>) STCK_0; | |
| <set_subcommand2>: DROP 1. | | cc) if the expression <index_expression> is not a constant and EXPR_VAR(<index_expression>) !=STCK_0, then one may assign:

| | |
|---|---|
| <set_subcommand1>: | WRITE_VAR_VAR |
| <unsigned_integer_array> | EXPR_VAR(<expression>) |
| EXPR_VAR(<index_expression>); | |
| <set_subcommand2>: empty; | |

Now the set-operator y[i]=x[i] in the program ORDER shown in FIG. 1 is considered. In this example, the following are true: <expression>="x[i]", <index_expression>="i", and <unsigned_integer_array>="y". So long as the block TRANS(<index expression>) is empty, the rule "a" may be applied for definition of the command <save_expression_command>. Thus, this command is empty. EXPR_VAR ("i")= "i", EXPR_VAR("x[i]")="x". One may apply the rule "cc" for the definition of the command <set_command>. Thus, the block TRANS("y[i]=x[i]") is:

```
0: READ x i;        // TRANS("x[i]")
1: WRITE_VAR_VAR y x i;   // set_command
``` c. Call-operator

The C++ program allows calling any void C++ function. The call of this function may be considered as the evaluation of the expression of the Case F above. Thus, the block TRANS(<call-operator>) may be defined as:
TRANS(<call-operator expression>).

d. If-operator

The if-operator is the following operator
if (<expression>)<positive_operator>
else <negative_operator>
where operators <positive_operator> and <negative_operator> are allowed to be empty.
To create the block TRANS(<if-operator>), the following cases may be considered:
  a) if the expression <expression> is a constant equal to zero, then the block TRANS(<if-operator>) is the block TRANS(<negative_operator>);
  b) if the expression <expression> is a constant that is not equal to zero, then the block TRANS(<if-operator>) is the block TRANS(<positive_operator>);
  c) if the expression <expression> is not a constant and both TRANS(<negative_operator>) and TRANS (<positive_operator>) are empty blocks, then the block TRANS(<if-operator>) is empty;
  d) if the expression <expression> is not a constant, the TRANS(<negative_operator>) is an empty block, and the TRANS(<positive_operator>) is not an empty block, then the block TRANS(<if-operator>) is:
    0: TRANS(<expression>)
    1: <compare_jump_command>
    2: TRANS(<positive_operator>)

where the command <compare_jump_command> includes 2 subcommands. If EXPR_VAR(<expression>)==STCK_0, then the first subcommand is DROP 1, otherwise the first subcommand is empty. The second subcommand is:
    ZERO_JUMP EXPR_VAR(<expression>)<address> where <address> is the address of the first command that situates after the block TRANS(<positive_operator>).
  e) if the expression <expression> is not a constant, the TRANS(<negative_operator>) is not an empty block, and the TRANS(<positive_operator>) is an empty block, then the block TRANS(<if-operator>) is:
    0: TRANS(<expression>)
    1: <compare_jump_command>
    2: TRANS(<negative_operator>)

where the command <compare_jump_command> includes 2 subcommands. If EXPR_VAR(<expression>)==STCK_0, then the first subcommand is DROP 1, otherwise the first subcommand is empty. The second subcommand is:
    NONZERO_JUMP EXPR_VAR(<expression>)<address> where <address> is the address of the first command that situates after the block TRANS(<negative operator>).
  f) if the expression <expression> is not a constant and both TRANS(<negative_operator>) and TRANS (<positive_operator>) are not empty blocks, then the block TRANS(<if-operator>) is;
    0: TRANS(<expression>)
    1: <compare_jump_command>
    2: TRANS(<positive_operator>)
    3: JUMP <address of the first command after the block TRANS(negative_operator)>
    4: TRANS(<negative_operator>)

where the command <compare_jump_command> includes 2 subcommands. If EXPR_VAR(<expression>)==STCK_0, then the first subcommand is DROP 1, otherwise the first subcommand is empty. The second subcommand is:
    ZERO_JUMP EXPR_VAR(<expression>)<address> where <address> is the address of the first command of the block TRANS(<negative_operator>).

e. for-Operator

The for-operator is as follows:
for (<at_start>; <expression>; <at_iteration_finish>) <body> where <at_start> and <at_iteration_finish> are the set-operators or empty, and <body> is any allowed C++ operator.
To create the block TRANS(<for-operator>), the following cases may be considered:
  a) if the expression <expression> is a constant equal to zero, then the block TRANS(<for-operator>) is empty;
  b) if the expression <expression> is a constant that is not equal to zero, then the block TRANS(<for-operator>) is:
    0: TRANS(<at_start>);
    1: BODY_BLOCK;

where the block BODY_BLOCK is:
    0: TRANS(<body>);
    1: TRANS(<at_iteration_command>);
    2: JUMP <address of first command of block BODY_BLOCK>
  c) if the expression <expression> not a constant, then the block TRANS(<for-operator>) is:

```
0: TRANS(<at_start>);
1: TRANS(<expression>);
2: <check_condition_command>
3: TRANS(<body>);
4: TRANS(<at_iteration_finish>)
5:   JUMP <address of first command of block
     TRANS(<expression>)+<check_condition_com-
     mand>
```
where the command <check_condition_command> includes 2 subcommands. If EXPR_VAR(<expression>)==STCK__0, then the first subcommand is DROP 1, otherwise the first subcommand is empty. The second subcommand is:

ZERO_JUMP EXPR_VAR(<expression>)<address> where <address> is the address of the first command that situates after the obtained block TRANS(<for-operator>).

In practice, most of the for-operators are such that the operator <at_start> initializes a variable (for example, i=0), the operator <at_iteration_finish> is the increment or decrement operator (i=i+1, or i=i−1), and the expression <expression> compares the value of a variable with a constant (i<10, i>=9, etc.).

The 4 subcommands called LOOP* in the processor language are used for optimization of the for-operators of the considered types. These commands are capable of doing 4 actions simultaneously:

```
TRANS(<expression>)
<check_condition_command>
TRANS(<at_iteration_finish>)
    JUMP <address of first command of block
    TRANS(<expression>)+<chack_condition_command>
```

The following two examples may be used to demonstrate how to use the subcommands LOOP* instead of the rule c) described above First, consider the for-command from the program ORDER shown in FIG. 1:

for (i=0;i<10;i=i+1) y[i]=x[i];

Instead of creating the block according to the rule c) described above, the block TRANS(<for-operator>) may be created as:

```
0: TRANS("i=0")
1: TRANS("y[i]=x[i]")
2: LOOP_INC_NOMORE i 8 <address of first command
   of block TRANS("y[i]=x[i]")>
```

Now consider the following example of a for-command:

for (i=9;i>=0;i=i−1) y[i]=x[i];

Instead of creating the block according to the rule c) described above, the block TRANS(<for-operator>) may be created as:

```
0: TRANS("i=0")
1: TRANS("y[i]=x[i]")
2: LOOP_DEC_NOLESS i 1 <address of first command
   of block TRANS("y[i]=x[i]")>
``` f. Begin-end-operator

Each begin-end-operator may be translated as the concatenation of the blocks created for each of operators included inside this begin-end-operator. The block TRANS(<begin-end-operator>) is the following block:

```
0: TRANS(<operator_1>)
1: TRANS(<operator_2>)
..........
N: TRANS(<operator_N>)
``` g. Break-operator

The break-operator: break; is placed inside the while and for operators to finish a cycle. Thus, the block TRANS(<break-operator>) may include one processor command:

JUMP <address of first command after the cycle>

(5) Result

FIG. 2 shows a result after the C++ program "ORDER" shown in FIG. 1 is translated into a parallel processor program in accordance with an exemplary embodiment of the method described above. Note that the staring address ("18") in FIG. 2 is the address of the function "main".

It is noteworthy that the method described in the foregoing Part C may translate a C++ programs into a parallel processor language with a minimum processor program length, but not necessarily with a minimum execution time. Part D below will describe a method (e.g., some powerful algorithms) to optimize execution time of a processor program.

D. Optimization of Execution Time of Parallel Processor Programs

A processor program loaded to a processor may be written in two different ways: (1) the program may be first written in some high-level programming language like C++, Pascal, etc., and the program may be then translated into the processor language; and (2) the program may be written in a processor language manually. In either case, it would be desirable to provide a method (e.g., some algorithms, and the like) that allows the execution time of a processor program to be optimized (e.g., minimized).

For example, commands 0-5 in FIG. 2 correspond to the C++ function "exch" shown in FIG. 1. It is easy to understand that the evaluation time of the function "exch" is equal to 6 clock cycles (the evaluation time of 6 processor commands with addresses 0-5). However, the function "exch" may be optimized as follows:

```
0: READ y exch::pos1;           // function "exch"
1: SET exch::tmp y; READ y exch::pos2;
2: WRITE y y pos1;
3: WRITE y exch::tmp pos2; RETURN;
``` where it takes only 4 clock cycles to evaluate the "exch" function. This is the minimal possible execution time because during execution of the function "exch" at least 4 reading/writing operations with the array "y" are required: reading the values y[pos1], y[pos2], and later writing new values to these elements of the array y. Because each of these operations takes 1 clock cycle to perform, at least 4 clock cycles are required to carry out the function "exch".

(1) Method of Execution Time Optimization

Denote a set OBJ that contains the following objects:

1) all variables and arrays that are used in the processor program;
2) stack EVAL_STACK;
3) variables ALD_0, ALD_1, ALD_OP, ALD_Z.

For any variable <var>, denote the subset ACCESS_LIST (<var>) of the set OBJ as follows:

a) If <var>==ALD_Z, then ACCESS_LIST (<var>)={ALD_0, ALD_1, ALD_OP}.
b) If <var>==STCK__0, STCK__1, e.t.c., then ACCESS_LIST(<var>)={EVAL_STACK}.
c) Otherwise, ACCESS_LIST(<var>)={<var>}.

For each subcommand <subcommand>, denote 2 subsets ACCESS(<subcommand>) and LOCK(<subcommand>) of the set OBJ described above as follows:

1A. Subcommand FIN. LOCK = empty. ACCESS = empty.

2A. Subcommand SET <variable_name_1> <variable_name_2>. LOCK = {<variable_name_1>}. ACCESS = ACCESS_LIST(<variable_name_2>).

2B. Subcommand SET_CONST <variable_name_1> <unsigned_integer_constant>. LOCK = {<variable_name_1>}. ACCESS = empty.

2C. READ <array_name> <variable_name>. LOCK = {<array_name>}. ACCESS = ACCESS_LIST(<variable_name>).

2D. READ_CONST <array_name> <unsigned_integer_constant>. LOCK = {<array_name>}. ACCESS = empty.

2F. WRITE_VAR_VAR <array_name> <variable_name> <index_variable_name>. LOCK = {<array_name>}. ACCESS = ACCESS_LIST(<variable_name>) U ACCESS_LIST(<index_variable_name>). (The symbol "U" means theoretical union of two sets).

2G. WRITE_VAR_CONST <array_name> <variable_name> <index_constant>. LOCK = {<array_name>}. ACCESS = ACCESS_LIST(<variable_name>).

2H. WRITE_CONST_VAR <array_name> <constant> <index_variable_name>. LOCK = {<array_name>}. ACCESS = ACCESS_LIST(<index_variable_name>).

2I. WRITE_CONST_CONST <array_name> <constant> <index_constant>. LOCK = {<array_name>}. ACCESS = empty.

4A. PUT <variable_name>. LOCK = {EVAL_STACK}. ACCESS = ACCESS_LIST(<variable_name>).

4B. PUT_CONST <unsigned_integer_constant>. LOCK = {EVAL_STACK}. ACCESS = empty.

4C. DROP <unsigned_integer_constant>. LOCK = {EVAL_STACK}. ACCESS = empty.

5A. CALL <address>. LOCK = empty. ACCESS = empty.

5B. RETURN. LOCK = empty. ACCESS = empty.

6A. JUMP <address>. LOCK = empty. ACCESS = empty.

6B. ZERO_JUMP <variable_name> <address>. LOCK = empty. ACCESS = ACCESS_LIST(<variable_name>).

6C. NONZERO_JUMP <variable_name> <address>. LOCK = empty. ACCESS = ACCESS_LIST(<variable_name>).

6D. LOOP_INC_NOLESS <variable_name> <constant_value> <address>. LOCK = {<variable_name>}. ACCESS = ACCESS_LIST(<variable_name>).

6E. LOOP_INC_NOMORE <variable_name> <constant_value> <address>. LOCK = {<variable_name>}. ACCESS = ACCESS_LIST(<variable_name>).

6F. LOOP_DEC_NOLESS <variable_name> <constant_value> <address>. LOCK = {<variable_name>}. ACCESS = ACCESS_LIST(<variable_name>).

6G. LOOP_DEC_NOMORE <variable_name> <constant_value> <address>. LOCK = {<variable_name>}. ACCESS = ACCESS_LIST(<variable_name>).

The defined sets LOCK(<subcommand>) and ACCESS(<subcommand>) are very important for the present method of optimization. The set LOCK(<subcommand>) includes a list of objects OBJ that are used by this subcommand in an exclusive mode. It is not allowed to place two different subcommands <subcommand1> and <subcommand2> in the same command of a processor program if the sets LOCK(<subcommand1>) and LOCK(<subcommand2>) intersect (or have a common element).

The set ACCESS(<subcommand>) includes objects whose values are used by this subcommand but not changed by this subcommand. It is allowed to place two or more subcommands in the same command if these subcommands have intersected sets ACCESS.

Let the subcommands <subcommand1> and <subcommand2> be such that the sets ACCESS(<subcommand1>) and LOCK(<subcommand2>) are intersected. Then it is allowed to place these subcommands in the same command of a processor program if and only if the subcommand <subcommand1> is placed before the subcommand <subcommand2>. For example, in the command 1 of last example (optimized function "exch"), there are 2 subcommands: "SET exch::tmp y" and "READ y exch::pos2". The array "y" belongs to both sets ACCESS("SET exch::tmp y") and LOCK("READ y exch::pos2"). Nevertheless it is allowed because the subcommand "SET exch::tmp y" is placed before the subcommand "READ y exch::pos2".

A command <command> is a jump-target command if there is a jump-subcommand with the address equal to the address of the command <command>. For example, in the processor program ORDER shown in FIG. 2, there are several jump-target commands: 0 (command 34 contains a jump-subcommand with address 0), 6 (command 30 contains a jump-subcommand with address 6), 23 (command 37 contains a jump-subcommand with address 23), and the like.

A command <command2> does not depend from a command <command1> if and only if for each subcommand pair (<subcommand1> of the command <command1>, and <subcommand2> of the command <command2>), the following 2 conditions are met:

1) the sets LOCK(<subcommand1>) and LOCK(<subcommand2>) are not intersected; and 2) the sets LOCK(<subcommand1>) and ACCESS(<subcommand2>) are not intersected.

For each command <command>, SIZE(<command>) may be denoted as the number of subcommands included in the command <command>. For each command <command>, the following is true: SIZE(<command>)<=N, where N is the maximal number of subcommands inside one processor command.

FIG. 3 is a flow diagram showing an exemplary method 300 for optimizing execution time of a parallel processor program in accordance with an exemplary embodiment of the present invention. The method 300 may start with step 302 in which a parallel processor program is received. The parallel processor program may be written in the processor language described in Part B of the present application. Dummy jumps optimization is performed 304. Linear code optimization is performed 306. Jumps optimization is performed 308. An inquiry is held in step 310 to see if there is any change made in the steps 304-308. If the answer is yes, the method goes back to the step 304. If the answer is no, then the resulted processor program is output 312.

The steps 304-308 are each described in detail below.

(2) Dummy Jumps Optimization

Figure 4:
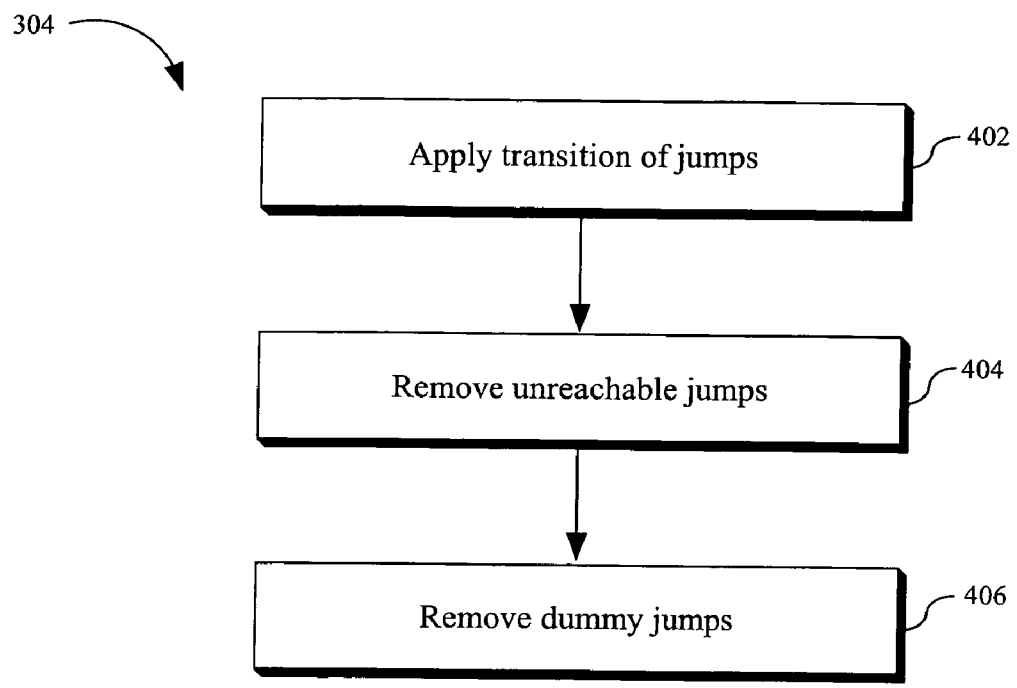
FIG. 4 is a flow diagram showing an exemplary embodiment of the step of making dummy jumps optimization shown in FIG. 3 in accordance with an exemplary embodiment of the present invention.

FIG. 4 is a flow diagram showing an exemplary embodiment of the step 304 of performing dummy jumps optimization shown in FIG. 3 in accordance with an exemplary embodiment of the present invention. As shown, the step 304 may start with step 402 in which transition of jumps is applied 402. In the step 402, commands of the processor program (command 0, command 1, command 2, and the like) are examined. For each command <command>, all jump-subcommands of the current command are examined. For each jump-subcommand <subcommand>, an inquiry is held to check if the jump-target command of the subcommand <subcommand> only includes subcommand: JUMP <new_address>. If the answer is yes, the jump address of the command <subcommand> is replaced with the new address <new_address>. The following is an example:

<subcommand>: ZERO_JUMP <var> <addr>
........................
addr: JUMP <new_addr>

When the above example is met in the program, the address <addr> in the subcommand is replaced with the new address <new_addr>, and the new <subcommand> may be obtained as follows:

ZERO_JUMP <var><new_addr>

Then, unreachable jumps are removed 404. These unreachable jumps (jumps that can never be reached) may appear after the step 402. In the step 404, commands of the processor program (command 0, command 1, command 2, and the like) are examined. For each command <command>, if the command <command> includes only subcommand JUMP, if the command <command> is not a jump-target, and if the previous command has subcommand JUMP (where the previous command is the command with an address less than the address of the current command <command> by 1), then the current command <command> is removed.

Next, dummy jumps are removed 406. In the step 406, commands of the processor program (command 0, command 1, command 2, and the like) are examined. For each command <command>, if the command <command> has address ADDR and has the subcommand JUMP (ADDR+1), then this subcommand is removed. If this subcommand is the only subcommand of the command <command>, then the command <command> is removed.

(3) Linear Code Optimization

The linear code optimization deals with processor program domains that contain the non-jump-subcommands only. The domain is a command or several neighboring commands of a processor program. The command(s) included in a domain may have addresses ADDR, ADDR+1, ..., (ADDR+M−1), where the ADDR is the address of the first command in the domain, and the M is the number of commands in the domain (or the length of the domain). A domain is a linear domain if an only if the following 2 conditions are met:

the domain includes non-jump-subcommands only;
all the commands of the domain other than the first command are not jump-target commands.

For example, here is a list of linear domains in the processor program ORDER shown in FIG. 2: commands 0-4 (first address ADDR=0, length M=5), command 6 (ADDR=6, M=1), commands 8-11 (ADDR=8, M=4), commands 13-16 (ADDR=13, M=4), command 18 (ADDR=18, M=1), commands 19-20 (ADDR=19, M=2), command 22 (ADDR=22, M=1), command 23 (ADDR=23, M=1), command 24 (ADDR=24, M=1), commands 26-29 (ADDR=26, M=4), commands 32-33 (ADDR=32, M=2), and command 35 (ADDR=35, M=1).

Figure 5:
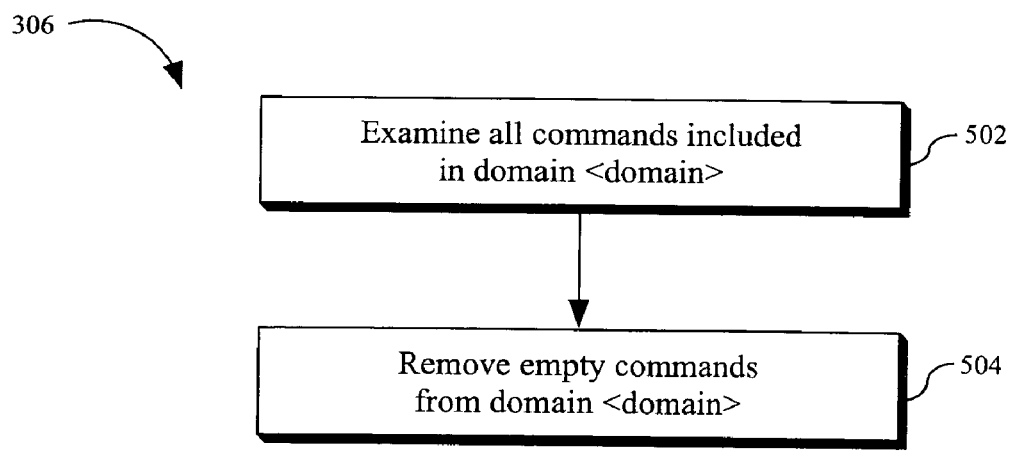
FIG. 5 is a flow diagram showing an exemplary embodiment of the step of making linear code optimization shown in FIG. 3 in accordance with an exemplary embodiment of the present invention.

FIG. 5 is a flow diagram showing an exemplary embodiment of the step 306 of performing linear code optimization shown in FIG. 3 in accordance with an exemplary embodiment of the present invention. The linear code optimization deals with the linear domains only. It takes one linear domain (called original domain), optimizes it, and replaces the original domain with the optimized one in the processor program. In a preferred embodiment, all the linear domains with length M>1 are examined. The step 306 may be applied to each linear domain <domain> with the first address ADDR and the size M>1.

As shown in FIG. 5, the step 306 may start with step 502 in which all commands included in the domain <domain> starting from the second command are examined. That is, commands with addresses ADDR+1, ..., ADDR+M−1 may be examined. For each examined command <command> with address K (where K=ADDR+1, ..., ADDR+M−1), all subcommands of the command <command> are examined. For each subcommand <subcommand>, the following steps may be performed:

a) evaluate the sets LOCK(<subcommand>) and ACCESS(<subcommand>);
b) find such a maximal address T_LOCK that K>T_LOCK>=ADDR and the command with address T_LOCK includes a subcommand <subcommand2> so that the set LOCK(<subcommand2>) intersects with the set LOCK(<subcommand>). If there is no such address T_LOCK, assign T_LOCK=−1;
c) find such a maximal address T_LOCK_ACCESS that K>T_LOCK_ACCESS>=ADDR and the command with address T_LOCK_ACCESS includes a subcommand <subcommand2> so that the set ACCESS(<subcommand2>) intersects with the set LOCK(<subcommand>). If there is no such address T_LOCK_ACCESS, assign T_LOCK_ACCESS=−1;
d) find such a maximal address T_ACCESS_LOCK that K>T_ACCESS_LOCK>=ADDR and the command with address T_ACCESS_LOCK includes a subcommand <subcommand2> so that the set LOCK(<subcommand2>) intersects with the set ACCESS(<subcommand>). If there is no such address T_ACCESS_LOCK, assign T_ACCESS_LOCK=−1;
e) define address T=max(ADDR, T_LOCK+1, T_LOCK_ACCESS, T_ACCESS_LOCK+1). The address T may take values K>=T>=ADDR.
f) if T==K, then go to step i) below, otherwise go to step g) below.

g) if SIZE(command with address T)<N, then the subcommand <subcommand> is appended to the command with the address T, and the subcommand <subcommand> is removed from the command <command> (that is the command with address K). Then go the step i) below.

h) set T=T+1, and go back to the step f) above.

i) finish processing the subcommand <subcommand>.

Next, all empty commands are removed from the domain <domain> 504. After the step 502, some commands in the domain <domain> may become empty (because all the subcommands of these commands may be moved up to the previous commands).

The following is an example: consider the domain containing commands 0-4 of the processor program ORDER shown in FIG. 2:

0: READ y exch::pos1;
  1: SET exch::tmp y;
  2: READ y exch::pos2;
  3: WRITE y y pos1;
  4: WRITE y exch::tmp pos2;

The command with K=1 (i.e., command 1) may be first examined, which has one subcommand "SET exch::tmp y". Applying the steps a)-i) of the step 502 described above to this subcommand, the following may be obtained:

LOCK("SET exch::tmp y")={exch::tmp};
  ACCESS("SET exch::tmp 3")={y};
  T_LOCK=−1 (there is no command in the domain before the current examined command that locks the variable "exch::tmp");
  T_LOCK_ACCESS=−1 (there is no command in the domain before the current examined command that accesses the variable "exch::tmp");
  T_ACCESS_LOCK=0 (there is a command 0 that has a subcommand that locks the array "y");
  T=1;

So long as T==K, nothing need be done with the subcommand "SET exch::tmp y".

The command with K=2 (i.e., command 2) is now examined, which has one subcommand "READ y exch::pos2". Applying the steps a)-i) of the step 502 described above to this subcommand, the following may be obtained:

LOCK("READ y exch::pos2")={y};
  ACCESS("READ y exch::pos2")={exch::pos2};
  T_LOCK=0 (there is a command 0 that has a subcommand that locks the variable "y");
  T_LOCK_ACCESS=1 (there is a command 1 in the domain before the current examined command that accesses the variable "y");
  T_ACCESS_LOCK=−1 (there is no command in the domain before the current examined command that accesses the variable "exch::pos2");
  T=1;

So long as the size of the command with address T is equal to 1<N, the subcommand "READ y exch::pos2" is moved from the command K=2 to the command T=1. Thus, the following may be obtained:

0: READ y exch::pos1;
  1: SET exch::tmp y; READ y exch::pos2;
  2:
  3: WRITE y y pos1;
  4: WRITE y exch::tmp pos2;

Then the command 3 is examined, and subcommand "WRITE y y pos1" is moved from the command 3 to the command 2. Then the command 4 is examined, and the subcommand "WRITE y exch::tmp pos2" is moved from the command 4 to the command 3. After all these, the following may be obtained:

0: READ y exch::pos1;
  1: SET exch::tmp y; READ y exch::pos2;
  2: WRITE y y pos1;
  3: WRITE y exch::tmp pos2;
  4:

In the step 504, the empty command 4 is removed.

(4) Jumps Optimization

The jumps optimization deals with optimization of commands containing some jump-subcommands and may be performed in the step 308 shown in FIG. 3. In the step 308, commands of the processor program (command 0, command 1, command 2, and the like) are examined. For each command <command>, the following scenarios A-D may be considered.

a. Scenario A

If the previous command has no jump-subcommand, the command <command> has jump-subcommand(s) and does not depend from the previous command, and SIZE(previous command)+SIZE(<command>)<=N, then the following cases a) and b) are considered:

a) If the command <command> is not a jump-target command, then the previous command is replaced with the union of the previous command and the command <command>, and the command <command> is later removed. Throughout the present invention, the term "union of 2 commands" means a new command that is created by taking all the subcommands of the first command and all the subcommands of the second command.

b) If the command <command> is a jump-target command, and the command <command> contains jump-subcommand JUMP or jump-subcommand RETURN, then the previous command is replaced with the union of the previous command and the command <command>.

For example, the following are the commands 35 and 36 of the processor program ORDER shown in FIG. 2:

35: SET j k;
  36: JUMP 24;

The current command <command> is the command 36, and the previous command is the command 35. Since all the conditions of the case a) are met, the command 35 is replaced with the union of the commands 35 and 36, and the command 36 is removed. Thus, the following may be obtained:

35: SET j k; JUMP 24;

b. Scenario B

If the previous command has jump-subcommand(s) but has no jump-subcommands of types CALL, RETURN and JUMP (consequently, it has jump-subcommands of types LOOP*, ZERO_JUMP and NONZERO_JUMP only), and the command <command> does not depend from the previous command, then consider the cases a), b) and c) as follows:

a) If the command <command> is not a jump-target command, and SIZE(previous command)+SIZE(<command>)<=N, then the previous command is replaced with the union of the previous command and the command <command>, and later the command <command> is removed;

b) If the command <command> is a jump-target command and contains jump-subcommand JUMP or jump-subcommand RETURN, and SIZE(previous command)+

SIZE(<command>)<=N, then the previous command is replaced with the union of the previous command and the command <command>;

c) If the command <command> is a jump-target command, the case b) above is not applicable, and SIZE (previous command)+SIZE(<command>)<N, then the previous command is replaced with the union of the previous command and the command <command>, and later the subcommand JUMP <ADDR+1> is appended to the end of the new previous command, where ADDR is the address of the command <command>.

For example, the following are the commands 7 and 8 of the processor program ORDER shown in FIG. 2:

7: ZERO_JUMP ALD_Z 13;
8: READ y need exch::pos1;

The current command <command> is the command 8, and the previous command is the command 7. Since all the conditions of the case a) are met, the command 7 is replaced with union of the commands 7 and 8, and the command 8 is removed. Thus, the following may be obtained:

7: ZERO_JUMP ALD_Z 13; READ y need_exch::pos1;

The following is another example:

0: ZERO_JUMP x 2;
1: ZERO_JUMP y 3;
2: SET y x;
3: FIN;

Suppose the command with address 2 is the command <command>. The previous command is the command with the address 1, and the ADDR=2. The command 2 is a jump-target command because the command 0 has a jump-subcommand with address 2. Thus, the cases a) and b) are not applicable here and the case c) is applied. Thus, the following may be obtained:

0: ZERO_JUMP x 2;
1: ZERO_JUMP y 3; SET y x; JUMP 3;
2: SET y x;
3: FIN;

Note that the new previous command (the command with the address 1) is obtained as the union of old commands 1 and 2 and the subcommand JUMP 3. This transformation of the program may reduce the program execution time from 4 clock cycles to 3 clock cycles when x!=0 and y!=0.

c. Scenario C

If the command <command> has a jump-subcommand <subcommand> of the type JUMP or CALL, the jump-target command of this subcommand has no jump-subcommand and does not depend from the command <command>, and SIZE(<command>)+SIZE(jump-target command)<=N, then all the subcommands of the jump-target command are inserted to the command <command> before the jump-subcommand <subcommand>, and the jump-address in the subcommand <subcommand> is increased by 1.

For example, consider the command 30 of the program ORDER shown in FIG. 2 as a command <command>. It has the jump-subcommand CALL 6. The jump-target command is the command with address 6. Since all the conditions of Scenario C are met, all the subcommands of the command 6 are inserted to the command 30 before subcommand CALL 6, and the address 6 is replaced with the address (6+1) in the subcommand CALL 6. The obtained new command 30 is shows as follows:

30: SET ALD_0 dir; SET_CONST ALD_1 0; SET_CONST ALD_OP "=="; CALL 7;

d. Scenario D

If the command <command> has a jump-subcommand <subcommand> of the type JUMP, and the jump-target command of this subcommand has some jump-subcommands and does not depend from the command <command>, then consider the following cases a), and b):

a) If the jump-target command has only one jump-subcommand <subcommand2> of types JUMP or CALL and has no more jump-subcommands (and it may have some non-jump-subcommands), and SIZE(<command>)+SIZE(jump-target command)<=(N+1), then all the subcommands of the jump-target command are inserted into the command <command> before the jump-subcommand <subcommand>, and the jump-subcommand <subcommand> is removed from the command <command>;

b) If the jump-target command has some non-jump-subcommands of any types and some jump-subcommands of types LOOP*, ZERO_JUMP and NONZERO_JUMP only, and SIZE(<command>)+SIZE(jump-target command)<=N, then all the subcommands of the jump-target command are inserted into the command <command> before the jump-subcommand <subcommand>, and the jump-subcommand <subcommand> is replaced with the subcommand JUMP <ADDR+1>, where the ADDR is the address of the jump-target command.

For example, consider the following processor program:

0: JUMP 2;
1: SET_CONST x 0; JUMP 4;
2: SET_CONST y 0;
3: JUMP 1;
4: FIN;

Suppose the command <command> is the command 3. The jump-subcommand <subcommand> is the subcommand JUMP 1. The jump-target command is the command 1, which has the JUMP subcommand. Since all the conditions of the case a) are met, the subcommands of the command 1 are inserted into the command 3 before the subcommand JUMP 1, and this subcommand is removed. The following may be obtained:

0: JUMP 2;
1: SET_CONST x 0; JUMP 4;
2: SET_CONST y 0;
3: SET_CONST x 0; JUMP 4;
4: FIN;

The obtained program takes 4 clock cycles for execution, instead of 5 clock cycles required by the original program.

Consider another example, where some small changes have been made to the jump-target command 1 in the above example, as follows:

0: JUMP 2;
1: SET_CONST x 0; ZERO_JUMP z 4;
2: SET_CONST y 0;
3: JUMP 1;
4: FIN;

In this example, since all the conditions of the case b) are met, the subcommands of the command 1 are inserted into the command 3 before the subcommand JUMP 1, and this subcommand is replaced with a new JUMP (ADDR+1), where ADDR=1. Thus, the following may be obtained:

0: JUMP 2;
1: SET_CONST x 0; ZERO_JUMP z 4;
2: SET_CONST y 0;

3: SET_CONST x 0; ZERO_JUMP z 4; JUMP 2;
4: FIN;
(5) Result

FIG. 6 shows a result after the program shown in FIG. 2 is optimized in accordance with an exemplary embodiment of the method 300 shown in FIG. 3. Note that the processor program ORDER shown in FIG. 2 includes 38 commands and the optimized processor program shown in FIG. 6 includes 24 commands only. For the following input values of variables and arrays: dir=0, x[10]=(0,1,2,3,4,5,6,7,8,9), the processor program shown in FIG. 2 takes 1243 clock cycles for execution, but the optimized processor program shown in FIG. 6 only takes 682 clock cycles for execution.

E. Advantages of Present Invention

The present invention may have the following advantages. First, a simple processor language is developed so that the control device (processor) that executes the processor commands may be a very simple IC, which may be easy to create. At the same time, this processor language of the present invention allows several subcommands to be executed in parallel (for example, different arrays and variables may be read and written in parallel), which makes it possible to reach a high speed of program execution. Furthermore, a program written in C++ programming language may be translated into the processor language according to the present invention. Moreover, the program written in the processor language may be easily optimized according to the present invention in order to increase the performance.

It is to be noted that the above described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of software package. Such a software package may be a computer program product which employs a storage medium including stored computer code which is used to program a computer to perform the disclosed function and process of the present invention. The storage medium may include, but is not limited to, any type of conventional floppy disks, optical disks, CD-ROMS, magneto-optical disks, ROMs, RAMs, EPROMs, EEPROMs, magnetic or optical cards, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for optimizing execution time of a parallel processor program, comprising:
   (a) receiving said parallel processor program;
   (b) performing dummy jumps optimization;
   (c) performing linear code optimization, wherein for a current subcommand included in a current command in a current domain in said parallel processor program said linear code optimization further comprises:
      1) evaluating a first list comprising objects that are used in an exclusive mode by the current subcommand and a second list comprising objects that are used by the current subcommand, but not changed by the current subcommand,
      2) determining a first maximal address that is less than the address of the current command and greater than or equal to an address of a first command of the current domain such that a second command with said first maximal address includes a second subcommand, wherein a third list, comprising objects that are used in an exclusive mode by the second subcommand, intersects with said first list comprising objects that are used in an exclusive mode by the current subcommand, and assigning a value representing a null address to said first maximal address when no first maximal address is found,
      3) determining a second maximal address that is less than the address of the current command and greater than or equal to an address of the first command of the current domain such that a third command with said second maximal address includes a third subcommand, wherein a fourth list, comprising objects that are used by the third subcommand, but not changed by the third subcommand, intersects with said first list comprising objects that are used in an exclusive mode by the current subcommand, and assigning said value representing said null address to said second maximal address when no second maximal address is found.
      4) determining a third maximal address that is less than the address of the current command and greater than or equal to an address of the first command of the current domain such that a fourth command with said third maximal address includes a fourth subcommand, wherein a fifth list, comprising objects that are used in an exclusive mode by the fourth subcommand, intersects with said second list comprising objects that are used by the current subcommand, but not changed by the current subcommand, and assigning said value representing said null address to said third maximal address when no third maximal address is found, and
      5) defining a fourth maximal address as a maximum value of the group consisting of (i) said address of said first command of the current domain, (ii) said first maximal address incremented by one, (iii) said second maximal address and (iv) said third maximal address incremented by one, where said fourth maximal address is less than the address of the current command and greater than or egual to the address of the first command of the current domain;
   (d) performing jumps optimization;
   (e) returning back to said step (b) when there is any change made in said steps (b), (c), and (d); and (f) outputting a resulted new processor program when there is no change made in said steps (b), (c), and (d).

2. The method of claim 1, wherein said step (b) further comprises:
(b1) applying transition of jumps;
(b2) removing unreachable jumps; and
(b3) removing dummy jumps.

3. The method of claim 1, wherein said step (c) further comprises:
examining all commands included in a said current domain; and
removing empty commands from said current domain.

4. A computer-readable medium having computer-executable instructions for performing a method for optimizing execution time of a parallel processor program, said method comprising:
(a) receiving said parallel processor program;
(b) performing dummy jumps optimization;
(c) performing linear code optimization, wherein for a current subcommand included in a current command in a current domain in said parallel processor program said linear code optimization further comprises:
  1) evaluating a first list comprising objects that are used in an exclusive mode by the current subcornmand and a second list comprising objects that are used by the current subcommand, but not changed by the current subcommand,
  2) determining a first maximal address that is less than the address of the current command and greater than or equal to an address of a first command of the current domain such that a second command with said first maximal address includes a second subcommand, wherein a third list, comprising objects that are used in an exclusive mode by the second subcommand, intersects with said first list comprising objects that are used in an exclusive mode by the current subcommand, and assigning a value representing a null address to said first maximal address when no first maximal address is found.
  3) determining a second maximal address that is less than the address of the current command and greater than or equal to an address of the first command of the current domain such that a third command with said second maximal address includes a third subcommand, wherein a fourth list, comprising objects that are used by the third subcommand, but not changed by the third subcommand, intersects with said first list comprising objects that are used in an exclusive mode by the current subcommand, and assigning said value representing said null address to said second maximal address when no second maximal address is found,
  4) determining a third maximal address that is less than the address of the current command and greater than or equal to an address of the first command of the current domain such that a fourth command with said third maximal address includes a fourth subcommand, wherein a fifth list, comprising objects that are used in an exclusive mode by the fourth subcommand, intersects with said second list comprising objects that are used by the current subcommand, but not chanced by the current subcommand, and assigning said value representing said null address to said third maximal address when no third maximal address is found, and
  5) defining a fourth maximal address as a maximum value of the group consisting of (i) said address of said first command of the current domain, (ii) said first maximal address incremented by one, (iii) said second maximal address and (iv) said third maximal address incremented by one, where said fourth maximal address is less than the address of the current command and greater than or eaual to the address of the first command of the current domain;
(d) performing jumps optimization;
(e) returning back to said step (b) when there is any change made in said steps (b), (c), and (d); and
(f) outputting a resulted new processor program when there is no change made in said steps (b), (c), and (d).

5. The method of claim 1, further comprising finishing processing of said current subcommand when said fourth maximal address equals the address of the current command.

6. The method of claim 1, further comprising:
when a number of subcommands contained in a fifth command with said fourth maximal address is less than a predetermined maximum number of subcommands for one processor command, appending said current subcommand to the fifth command, removing said current subcommand from said current command, and finishing processing said current subcommand.

7. The method of claim 6, further comprising:
when the number of subcommands contained in the fifth command with said fourth maximal address is not less than the predetermined maximum number of subcommands for one processor command, incrementing the fourth maximal address; and
when said fourth maximal address equals the address of the current command finishing processing of said current subcommand, otherwise repeating the steps of claim 6.

8. A method for optimizing execution time of a parallel processor program, comprising:
(A) receiving said parallel processor program;
(B) performing dummy jumps optimization;
(C) performing linear code optimization;
(D) performing jumps optimization, wherein for a current command having a previous command immediately preceding said current command, said jumps optimization comprises:
  (1) when (i) said previous command has no jump-subcommand, (ii) said current command has at least one jump-subcommand and does not depend from said previous command, and (iii) a sum of a number of subcommands contained in said previous command plus a number of subcommands contained in said current command is less than or equal to a predetermined maximum number of sub-commands in a processor command, performing the steps of:
    a) when said current command is not a jump-target command, replacing said previous command with a union of said previous command and said current command, and removing said current command; and
    b) when said current command is a jump-target command, and said current command contains either a jump-subcommand of type JUMP or a jump-subcommand of type RETURN, replacing said previous command with a union of said previous command and said current command;
  (2) when (i) said previous command has at least one jump-subcommand but has no jump-subcommands of types CALL, RETURN and JUMP, and (ii) said current command does not depend from said previous command, performing the steps of:

a) when said current command is not a jump-target command, and the sum of the number of subcommands in said previous command plus the number of subcommands in said current command is less than or equal to the predetermined maximum number of subcommands in a processor command, replacing said previous command with a union of said previous command and said current command, and removing said current command;

b) when (i) said current command is a jump-target command and contains either a jump-subcommand of type JUMP or a jump-subcommand of type RETURN, and (ii) the sum of the number of subcommands in said previous command plus the number of subcommands in said current command is less than or equal to the predetermined maximum number of subcommands in a processor command, replacing said previous command with a union of said previous command and said current command; and c) when (i) said current command is a jump-target command, (ii) said step b) of said step (2) is not applicable, and (iii) the sum of the number of subcommands in said previous command plus the number of subcommands in said current command is less than the predetermined maximum number of subcommands in a processor command, replacing said previous command with a union of said previous command and said current command, and appending a subcommand of type JUMP, with an address argument set to an address of said current command plus one, to an end of said newly replaced previous command;

(3) when (i) said current command has either a jump-subcommand of type JUMP or a jump-subcommand of type CALL, (ii) a jump-target command of said jump-subcommand has no jump-subcommand and does not depend from said current command, and (iii) a sum of the number of subcommands in said current command plus a number of subcommands in said jump-target command is less than or equal to the predetermined maximum number of subcommands in a processor command, inserting all subcommands of said jump-target command into said current command at a location before said jump-subcommand, and increasing a jump-address in said jump-subcommand by one; and (4) when (i) said current command has a jump-subcommand of type JUMP and (ii) a jump-target command of said jump-subcommand has at least one jump-subcommand and does not depend from said current command, performing the steps of:

a) when (i) said jump-target command has only one jump-subcommand of either type JUMP or type CALL and has no more jump-subcommands, and (ii) a sum of the number of subcommands in said current command plus a number of sub-commands in said jump-target command is less than or equal to the predetermined maximum number of subcommands in a processor command plus one, inserting all subcommands of said jump-target command into said current command before said jump-subcommand, and removing said jump-subcommand from said current command;

b) when (i) said jump-target command has at least one non-jump-subcommand of any type and at least one jump-subcommand having a type selected from the group consisting of LOOP_INC_NOLESS, LOOP_INC_NOMORE, LOOP_DEC_NOLESS, LOOP_DEC_NOMORE, ZERO_JUMP and NONZERO_JUMP, and (ii) a sum of the number of subcommands in said current command plus a number of sub-commands in said jump-target command is less than or equal to the predetermined maximum number of subcommands in a processor command, inserting all subcommands of said jump-target command into said current command at a location before said jump-subcommand, and replacing said jump-subcommand with a subcommand of type JUMP having an address argument set to an address of said jump-target command plus one;

(E) returning back to said step (B) when there is any change made in said steps (B), (C), and (D); and (F) outputting a resulted new processor program when there is no change made in said steps (B), (C), and (D).

9. A computer-readable medium having computer-executable instructions for performing a method for optimizing execution time of a parallel processor program, said method comprising:

(A) receiving said parallel processor program;
(B) performing dummy jumps optimization;
(C) performing linear code optimization;
(D) performing jumps optimization, wherein for a current command having a previous command immediately preceding said current command, said jumps optimization comprises:

(1) when (i) said previous command has no jump-subcommand, (ii) said current command has at least one jump-subcommand and does not depend from said previous command, and (iii) a sum of a number of subcommands contained in said previous command plus a number of subcommands contained in said current command is less than or equal to a predetermined maximum number of sub-commands in a processor command, performing the steps of:

a) when said current command is not a jump-target command, replacing said previous command with a union of said previous command and said current command, and removing said current command; and b) when said current command is a jump-target command, and said current command contains either a jump-subcommand of type JUMP or a jump-subcommand of type RETURN, replacing said previous command with a union of said previous command and said current command;

(2) when (i) said previous command has at least one jump-subcommand but has no jump-subcommands of types CALL, RETURN and JUMP, and (ii) said current command does not depend from said previous command, performing the steps of:

a) when said current command is not a jump-target command, and the sum of the number of subcommands in said previous command plus the number of subcommands in said current command is less than or equal to the predetermined maximum number of subcommands in a processor command, replacing said previous command with a union of said previous command and said current command, and removing said current command;

b) when (i) said current command is a jump-target command and contains either a jump-subcommand of type JUMP or a jump-subcommand of type RETURN, and (ii) the sum of the number of subcommands in said previous command plus the number of subcommands in said current command is less than or equal to the predetermined maximum number of subcommands in a processor command, replacing said previous command with a union of said previous command and said current command; and c) when (i) said current command is a jump-target command, (ii) said step b) of said step (2) is not applicable, and (iii) the sum of the number of subcommands in said previous command plus the number of subcommands in said current command is less than the predetermined maximum number of subcommands in a processor command, replacing said previous command with a union of said previous command and said current command, and appending a subcommand of type JUMP, with an address argument set to an address of said current command plus one, to an end of said newly replaced previous command;

(3) when (i) said current command has either a jump-subcommand of type JUMP or a jump-subcommand of type CALL, (ii) a jump-target command of said jump-subcommand has no jump-subcommand and does not depend from said current command, and (iii) a sum of the number of subcommands in said current command plus a number of subcommands in said jump-target command is less than or equal to the predetermined maximum number of subcommands in a processor command, inserting all subcommands of said jump-target command into said current command at a location before said jump-subcommand, and increasing a jump-address in said jump-subcommand by one; and (4) when (i) said current command has a jump-subcommand of type JUMP and (ii) a jump-target command of said jump-subcommand has at least one jump-subcommand and does not depend from said current command, performing the steps of:

a) when (i) said jump-target command has only one jump-subcommand of either type JUMP or type CALL and has no more jump-subcommands, and (ii) a sum of the number of subcommands in said current command plus a number of sub-commands in said jump-target command is less than or equal to the predetermined maximum number of subcommands in a processor command plus one, inserting all subcommands of said jump-target command into said current command before said jump-subcommand, and removing said jump-subcommand from said current command;

b) when (i) said jump-target command has at least one non-jump-subcommand of any type and at least one jump-subcommand having a type selected from the group consisting of LOOP_INC_NOLESS, LOOP_INC_NOMORE, LOOP_DEC_NOLESS, LOOP_DEC_NOMORE, ZERO_JUMP and NONZERO_JUMP, and (ii) a sum of the number of subcommands in said current command plus a number of sub-commands in said jump-target command is less than or equal to the predetermined maximum number of subcommands in a processor command, inserting all subcommands of said jump-target command into said current command at a location before said jump-subcommand, and replacing said jump-subcommand with a subcommand of type JUMP having an address argument set to an address of said jump-target command plus one;

(E) returning back to said step (B) when there is any change made in said steps (B), (C), and (D); and (F) outputting a resulted new processor program when there is no change made in said steps (B), (C), and (D).

* * * * *